(12) United States Patent
Satake

(10) Patent No.: US 7,552,788 B2
(45) Date of Patent: Jun. 30, 2009

(54) MOTORCYCLE

(75) Inventor: Hidenori Satake, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 394 days.

(21) Appl. No.: 11/559,853

(22) Filed: Nov. 14, 2006

(65) Prior Publication Data

US 2007/0107967 A1    May 17, 2007

(30) Foreign Application Priority Data

Nov. 14, 2005    (JP) .............................. 2005-328521

(51) Int. Cl.
*B60K 11/04* (2006.01)
(52) U.S. Cl. ..................... 180/68.1; 180/219
(58) Field of Classification Search .................. 180/219, 180/68.1
See application file for complete search history.

(56) References Cited

U.S. PATENT DOCUMENTS 5,211,255 A * 5/1993 Fukuda ........................ 180/219
6,341,792 B1 * 1/2002 Okuma ..................... 280/304.3
D515,985 S * 2/2006 Kishi et al. ................ D12/126

FOREIGN PATENT DOCUMENTS

| JP | 03193584 A | * | 8/1991 |
| JP | 04-339090 |   | 11/1992 |

* cited by examiner

*Primary Examiner*—Kevin Hurley
(74) *Attorney, Agent, or Firm*—Hogan & Hartson LLP

(57) ABSTRACT

A motorcycle that with a head pipe neighboring section of tank rails. Left and right tank rails are formed such that a vehicle width direction space becomes narrower as the tank rails extend toward the head pipe side. Left and right body covers have a front side neighboring section adjacent to a front side outer side section of the tank rails, a rear side neighboring section further to the rear and further to the outer side in the vehicle width direction than the front side neighboring section, and an overhanging surface that is continuous with the front side neighboring section in plan view, and that is disposed to the side of the front side outer side section such that the overhanging surface protrudes outwards in the vehicle width direction from the front side outer side section of the tank rails.

14 Claims, 8 Drawing Sheets

[Fig. 1]
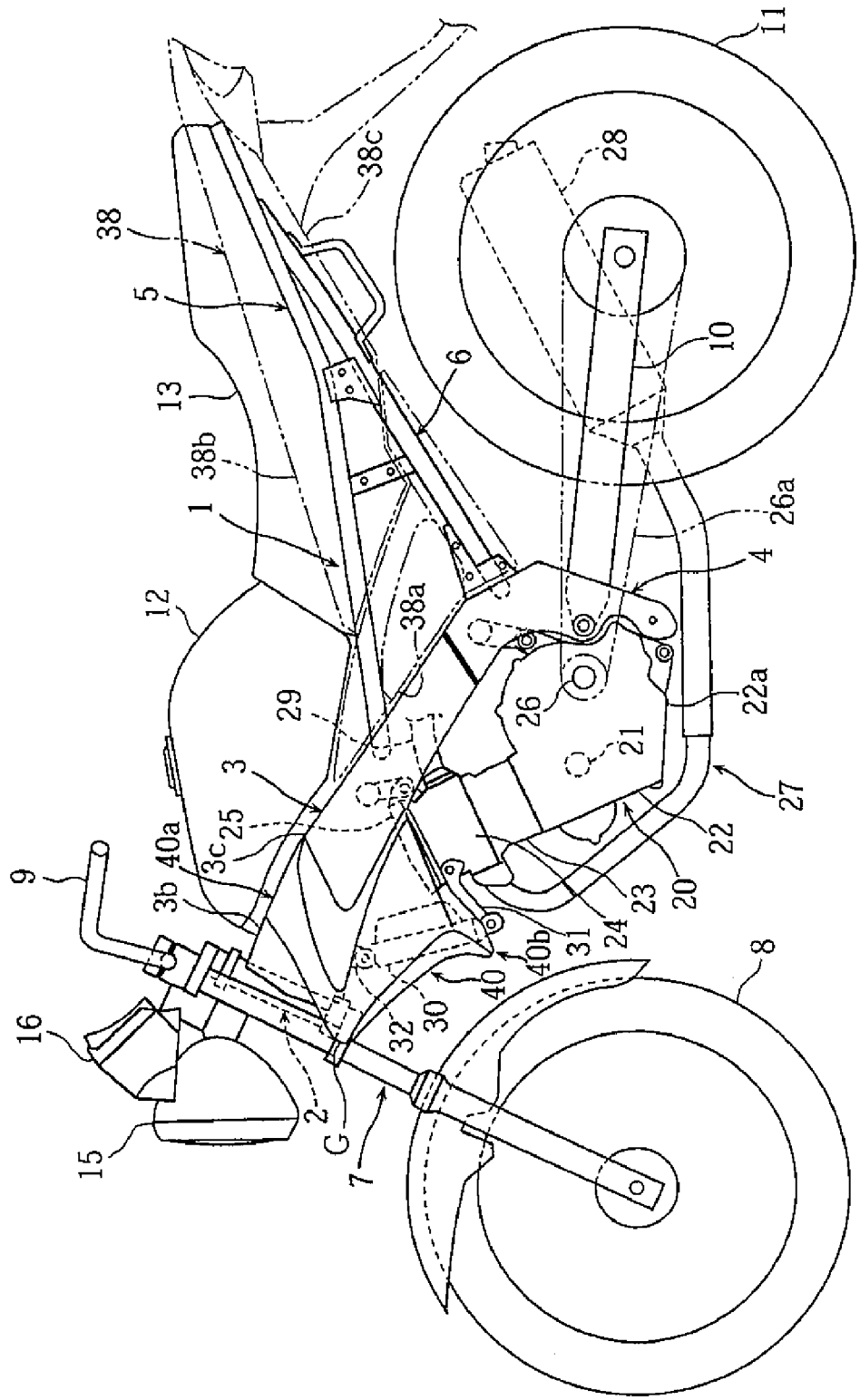

[Fig. 2]
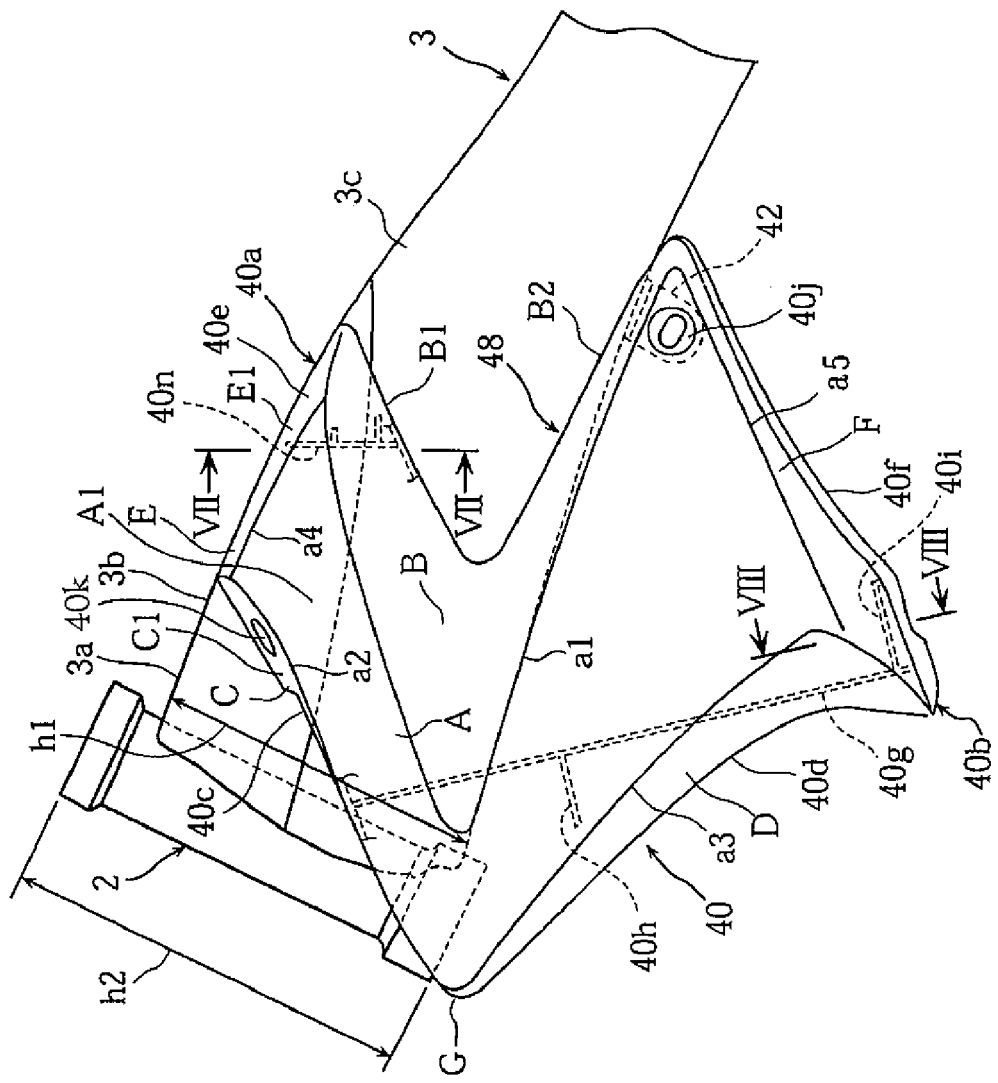

[Fig. 3]
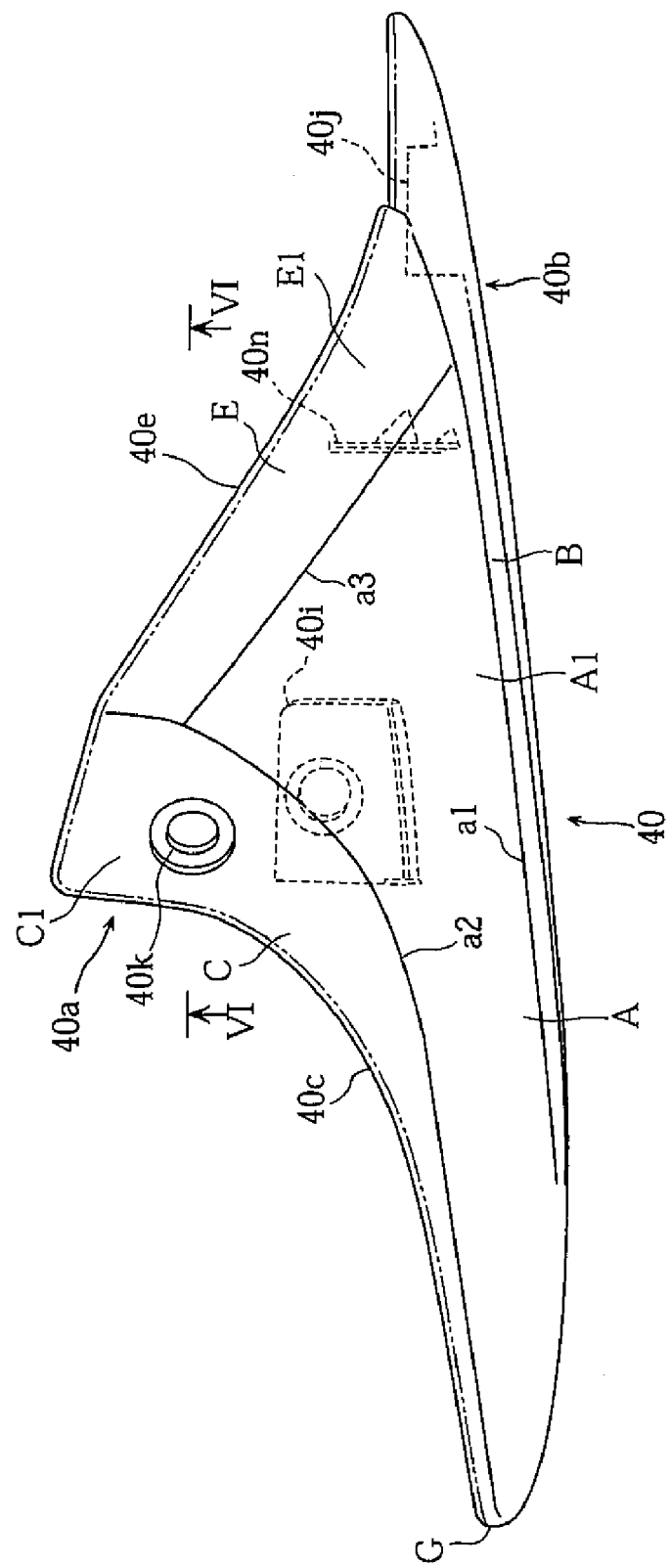

[Fig. 4]
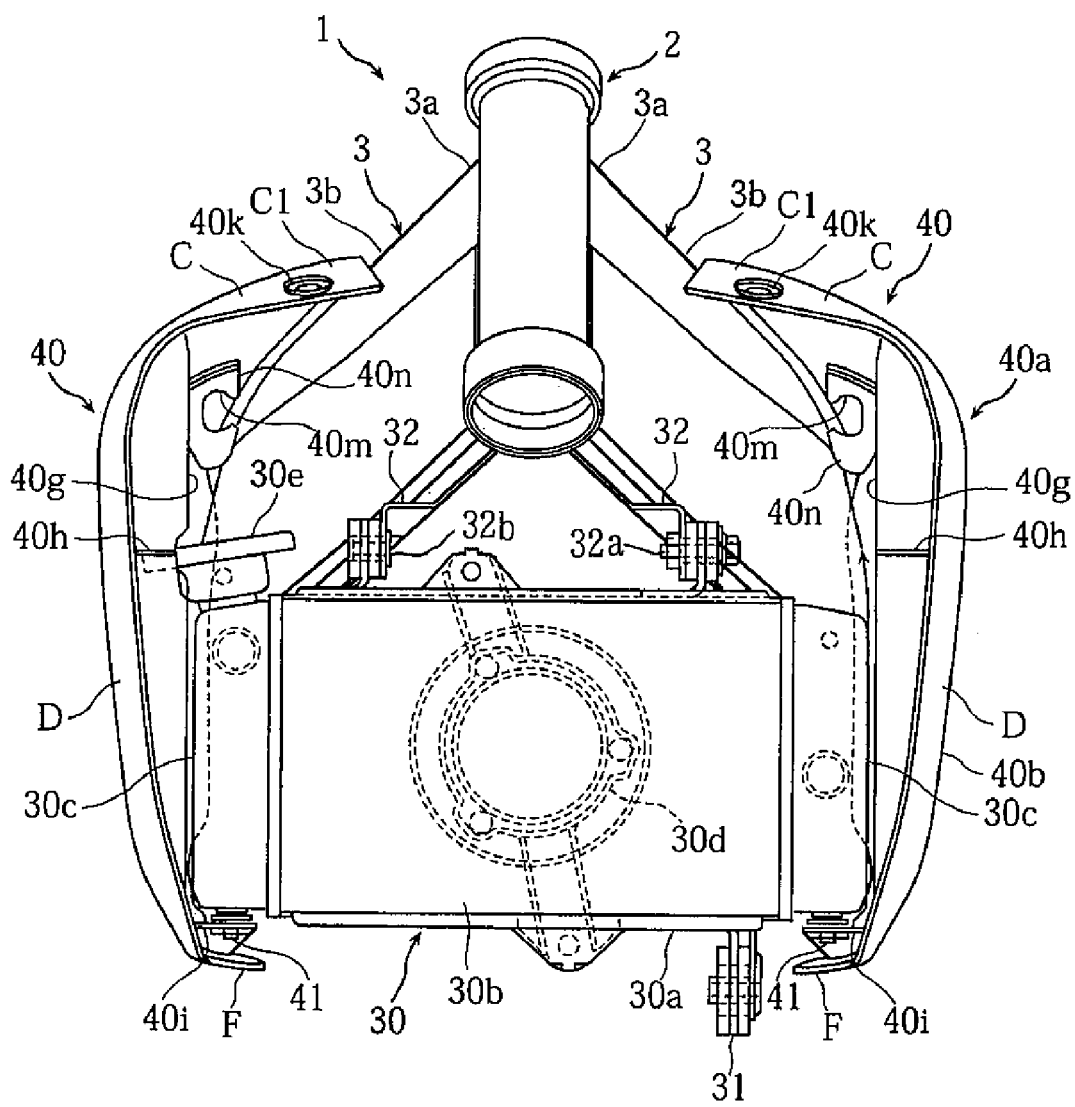

[Fig. 5]
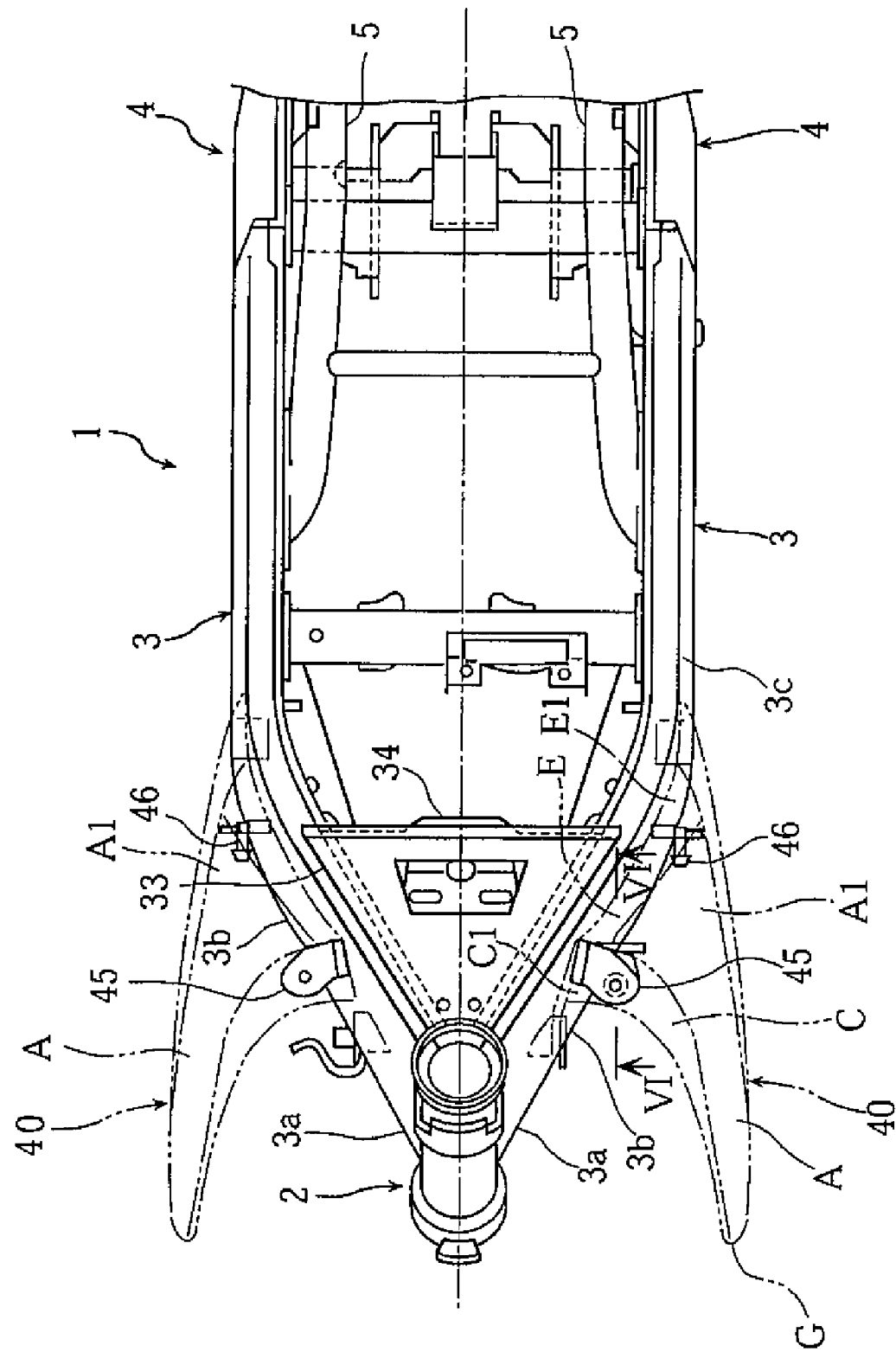

[Fig. 6]
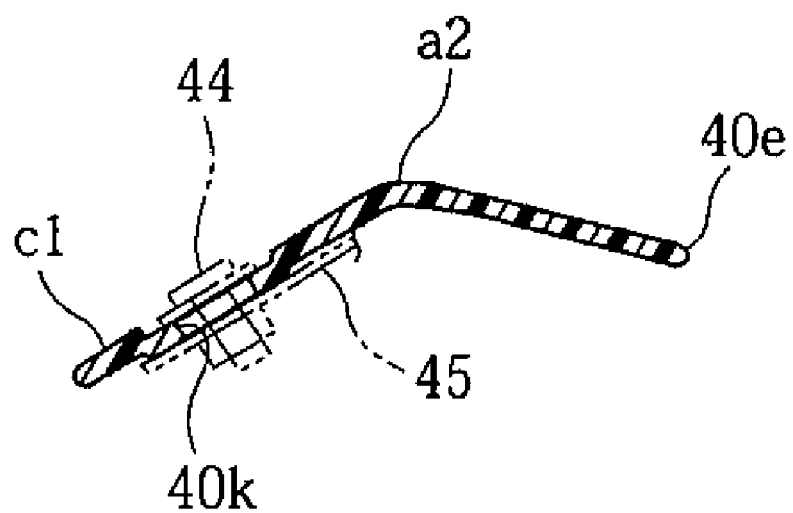

[Fig. 7]
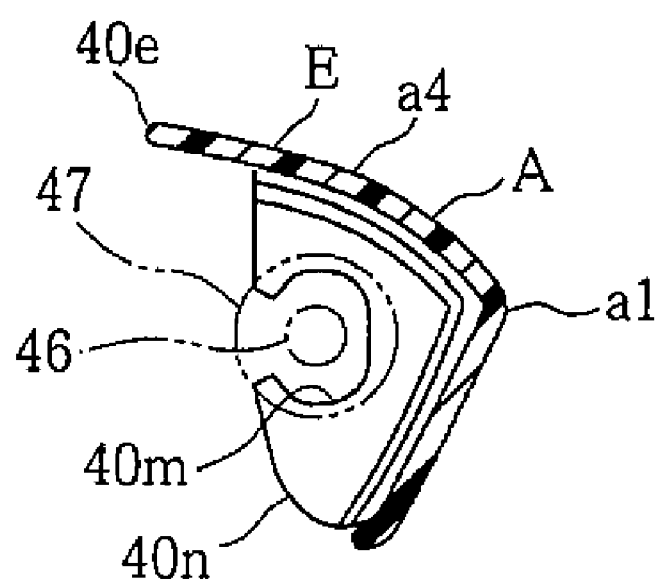

[Fig. 8]
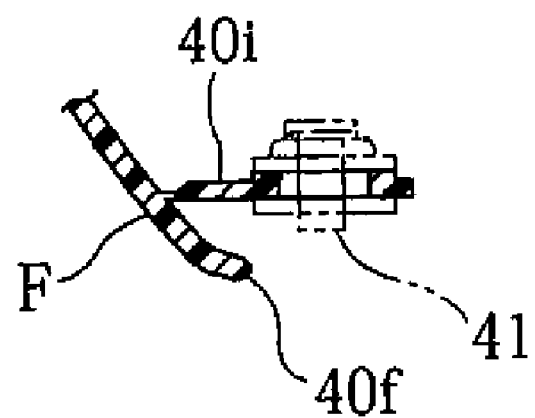

MOTORCYCLE

RELATED APPLICATIONS

This application claims the benefit of priority under 35 USC 119 of Japanese patent application no. 2005-328521, filed on Nov. 14, 2005, which application is hereby incorporated by reference in its entirety.

BACKGROUND OF THE INVENTION

1. Field of the Invention

The present invention relates to a motorcycle that includes a pair of left and right tank rails that extend rearward from a head pipe, and a body cover that is provided outside the left and right tank rails.

2. Description of Related Art

Japanese Patent No. 2979015, for example, proposes a structure in which an engine is mounted beneath a left and a right tank rail, and a radiator is positioned in front of the engine. A radiator cover that introduces traveling wind to the radiator is provided outside of the left and right tank rails.

The radiator cover includes an upper section and a lower section. The upper section extends along a head pipe neighboring section of the tank rails, and the lower section is formed with a curved shape that continues from the upper section and spreads out in a fan-like shape to the outer side in a vehicle width direction.

However, since the upper section of the radiator cover extends along the head pipe neighboring section of the tank rails, the structure does not have an external appearance around the head pipe neighboring section that creates an impression of robustness and strength. More specifically, the head pipe neighboring section of the tank rails is inclined toward the inside such that the vehicle width space becomes narrower as the head pipe neighboring section extends toward the head pipe side. Extending the radiator cover along this section does not create an impression that the area of the tank rails around the head pipe is large.

SUMMARY OF THE INVENTION

The invention has been devised in light of these circumstances and provides a motorcycle with an improved external appearance of the head pipe neighboring section of tank rails.

One embodiment of the invention is a motorcycle including a head pipe, left and right tank rails extending in a vehicle rear direction from the head pipe, and body covers disposed to outer sides of the tank rails in a vehicle width direction. A vehicle width direction space between outer side sections of the tank rails becomes narrower as the outer side sections extend toward the head pipe. The body covers have a front side neighboring section adjacent to a front side outer side section of each tank rail that is close to the head pipe, a rear side neighboring section further to the rear in a vehicle front-rear direction and further to an outer side in the vehicle width direction than the front side neighboring section such that the rear side neighboring section is adjacent to a rear side outer side section of each tank rail that is farther from the head pipe than the front side outer side section, and an overhanging surface that, in a plan view, is continuous with the front side neighboring section and is disposed to the side of the front side outer side section such that the overhanging surface protrudes outwards in the vehicle width direction from the front side outer side section of the tank rails.

According to the invention, the body covers include front side and rear side neighboring sections that are adjacent to the front side and the rear side outer side sections of the tank rails. In addition, the overhanging surfaces of the body covers protrude outwards in the vehicle width direction from the front side outer side section and cover the front side outer side section. As a result, the body cover has a frame shape in which the head pipe neighboring section of the tank rails becomes narrower, and a shape that is solid and 3-dimensional. In addition, the area around the head pipe coveys a greater impression of being large, and thereby has an external appearance that creates an impression of robustness and strength.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to an embodiment of the invention.

FIG. 2 is a side view of a front cover of the motorcycle.

FIG. 3 is a plan view of the front cover.

FIG. 4 is a front view of the front cover.

FIG. 5 is a plan view showing the relationship of the front cover and a tank rail.

FIG. 6 is a cross sectional view of the front cover along line VI-VI of FIG. 3.

FIG. 7 is a cross sectional view of the front cover along line VII-VII of FIG. 2.

FIG. 8 is a cross sectional view of the front cover along line VIII-VIII of FIG. 2.

DETAILED DESCRIPTION OF THE INVENTION

An embodiment of the invention is now described with reference to the appended drawings.

FIGS. 1-8 explain the motorcycle according to the embodiment of the invention. The terms front and rear and left and right, as used herein, indicate the front and rear and the left and right directions from the perspective of a rider mounted on the seat. In addition, the terms up and down as used in the present embodiment indicate upwards and downwards in a vertical direction that is perpendicular to the road surface.

In the figures, 1 indicates a body frame of the motorcycle. Body frame 1 includes a head pipe 2; left and right tank rails 3, 3 that extend diagonally downwards from the head pipe 2 in the vehicle rear direction; rear arm brackets 4, 4 that extend continuously downwards from rear ends of the tank rails 3, 3; seat rails 5, 5 that extend diagonally upwards from the tank rails 3, 3 in the vehicle rear direction; and seat stays 6, 6 that are disposed in a suspended manner between rear sections of seat rails 5, 5 and rear arm brackets 4, 4.

A front fork 7 is supported by the head pipe 2 to be steered to the left and the right. A front wheel 8 is rotatably supported at a lower end of the front fork 7. A steering handle 9 is attached to an upper end of the front fork 7. A headlight 15 is disposed on a front side of the head pipe 2, and a meter device 16 including a speedometer and the like is disposed on an upper section of the headlight 15.

A front section of a rear arm 10 is supported by rear arm brackets 4 in a manner to swing upward and downward. A rear section of the rear arm 10 pivotably supports a rear wheel 11.

A fuel tank 12 is mounted on top of tank rails 3, 3, and a seat 13 on which two riders can sit is mounted on top of seat rails 5, 5.

A water-cooled engine 20 is mounted beneath tank rails 3, 3. The engine 20 has a bolt tightened structure including a crank case 22 that houses a crank shaft 21. A cylinder block 23, a cylinder head 24, and a head cover 25 are stacked on a mating surface on the top of the crank case 22, and bolted and tightened thereto.

A transmission case 22a that incorporates a transmission device (not shown) is formed integrally with a rear section of the crank case 22. A drive shaft 26 that is disposed in a rear section of the transmission case 22 rotatably drives the rear wheel 11 via a chain 26a.

An exhaust pipe 27 is connected to a front wall section of the cylinder head 24. The exhaust pipe 27 extends downwards from the front wall section, passes beneath the engine 20, extends in the vehicle rear direction, and is connected to a muffler 28 that is disposed to the right side of the rear wheel 11.

A rear wall section of the cylinder head 24 is connected to an intake passage 29. The intake passage 29 extends in the rearward direction beneath the fuel tank 12 and is connected to an air cleaner (not shown).

A radiator 30 is disposed at an upper front side of the engine 20. The radiator 30, as can be seen from FIG. 4, includes a core member 30b that is supported by a frame member 30a that has a rectangular shape; left and right tank members 30c, 30c that are disposed on the left and right sides of the core member 30b; and an electric fan 30d that is disposed at the rear surface of the core member 30b. A radiator cap 30e is removably attached to the right tank member 30c.

A left upper wall section of the radiator 30 is fastened and fixed to a radiator bracket 32, which is attached to a lower surface of the right tank rail 3 by a bolt 32a. A left lower end section of the radiator 30 is fastened and fixed by a bolt to the cylinder head 24 via an arm bracket 31. A right upper wall section of the radiator 30 is fixed to the radiator bracket 32 by a pin 32b, and is positioned thereby.

Tank rails 3, 3 are extruded parts with a square prism like shape and a cross section that forms a long-sided rectangle having a dimension in the upward-downward direction that is larger than the vehicle width dimension. As tank rails 3, 3 extend from the rear side thereof to the front side thereof, their dimension in the upward-downward direction gradually becomes larger. A front end section 3a of tank rails 3 is a head pipe connecting member and has an upward-downward direction dimension h1 (FIG. 2) that is the same as or less than an axial direction dimension h2 of the head pipe 2. Since the upward-downward direction dimension h1 of the tank rails 3 is substantially equal to the axial direction dimension h2 of the head pipe 2, the joining strength and rigidity of tank rails 3 and the head pipe 2 can be increased. Further, the structure can withstand the large bending moment that is applied to the joining section of the head pipe 2 and the front end section 3a.

The tank rails 3, 3, when seen in a plan view (FIG. 5), have straight sections 3c, 3c that extend linearly in the vehicle front-back direction, and inside inclined sections 3b, 3b that extend from front ends of the straight sections 3c, 3c and have a narrower vehicle width space as they extend toward the head pipe 2. A front end section 3a of the inclined sections 3b, 3b is weld bonded to the head pipe 2. The interior angle of the inclined sections 3b, 3b is roughly 60 degrees. Triangular shaped upper and lower gussets 33, 34 are bonded by welding to an upper surface and a lower surface of the inclined sections 3b, 3b. An outside section of the inclined sections 3b forms a front side outer side section that is near to the head pipe 2, and an outside section of the straight sections 3c forms a rear side outer side section that is far from the head pipe 2.

The seat rails 5, 5 and the seat stays 6, 6 are covered by left and right side covers 38, 38 that are made of resin. When viewed from the side of the vehicle, the side covers 38 have a generally inverted triangular shape, and have front edges 38a that extend along the upper surface of the tank rails 3; upper edges 38b that extend along lower edge sections of the fuel tank 12 and the seat 13; and lower edges 38c that extend along the seat stays 6.

In addition, front covers 40, 40 that are made of resin are provided at the vehicle outer side of the tank rails 3, 3. The front covers 40, 40 function as air scoops that introduce traveling wind to the radiator 30, and also function as decorative plates that cover between the tank rails 3, the engine 20, and the head cover 25, thereby improving exterior appearance. The front covers 40, 40 have shapes that generally have left-right line symmetry. The explanation given here will mainly focus on the left front cover 40.

The left front cover 40 has an upper half section 40a that covers an outer side wall of the left tank rail 3, and a lower half section 40b that extends continuously downwards from the upper half section 40a and that covers the gap between the outer side of the radiator 30 and the tank rail 3 and the head cover 25. The left front cover 40 has a shape that is generally a side ways V-shape when viewed from the side. Further, the front cover 40 is a three dimensional structure that has a plurality of continuous surfaces A-F that have boundaries formed by edge lines a1-a5 and that have different angles with respect to the edge lines (see, e.g. FIG. 2).

The edge line a1, when viewed from the side, forms a shape that is generally a side ways V-shape and that extends diagonally forwards and downwards along generally the center in the front-back direction of the upper half section 40a, and that extends diagonally downwards to the rear along the boundary of the upper half section 40a and the lower half section 40b. The edge lines a2, a3 extend, respectively, diagonally downward to the front and diagonally downward to the rear along the side ways V-shape of the edge line a1. In addition, the edge lines a4, a5 extend between and connect the upper end sections and the lower end sections of the edge lines a1, and a2, a3.

The region that is surrounded by the edge lines a1, a2, a3, a4, a5 forms an expanding continuous surface A that expands in the outward direction from the tank rail 3 and that has a shape that is generally a side ways V-shape. A rear side section of the edge line a1 forms generally a side ways V-shape, a trough shaped continuous surface B.

the region that is surrounded by the edge line a2 and an upper side front edge 40c of the upper half section 40a forms an upper side vehicle width direction continuous surface C that extends in a curved shape toward the outer side surface of the tank rail 3 in the vehicle width direction.

The region surrounded by the edge line a3 and a lower side front edge 40d of the lower half section 40b forms a lower side vehicle width direction continuous surface D that extends in a curved shaped toward the inside in the vehicle width direction. The region surrounded by the edge line a4 and an upper edge 40e of the upper half section 40a forms an upper edge continuous surface E that has a curved shape that extends toward the upper edge of the tank rail 3, and extends along the upper edge. The region surrounded by the edge line a5 and a lower edge 40f of the lower half section 40b forms a lower edge continuous surface F.

When seen in a plan view (FIG. 5), a vehicle width direction inside end section of the continuous surface C forms a front side neighboring section C1 that is adjacent to the front side outer side section 3b of the tank rail 3 that is near to the head pipe 2. Further, a rear end section of the upper edge continuous surface E forms a rear side neighboring section E1 that is disposed at a position further to the rear in the vehicle front-rear direction and further to the outside in the vehicle width direction than the front side neighboring section C1, such that the rear side neighboring section E1 is adjacent to a rear side outer side section 3c of the tank rail 3 that is far from the head pipe 2. The rear side neighboring section E1 and the front side neighboring section C1 are both positioned in the vicinity of the upper edge of the tank rail 3.

An upper section of the expanding continuous surface A forms an overhanging surface A1 that is disposed to the side of the front side outer side section 3b such that the overhanging surface A1 protrudes outwards in the vehicle width direction from the front side outer side surface 3b of the tank rail 3. The overhanging surface A1 forms a front-rear direction continuous surface that extends continuously from a neighboring section of the rear side neighboring section E1 in the vehicle front-rear direction.

When the vehicle is viewed from the side, the vehicle width direction continuous surface C positioned at the upper front edge of the front cover 40 is positioned to the rear of and beneath the headlight 15. As a result, the headlight 15 is exposed to the side. A front end section G of the front cover 40 extends to a position that overlaps a lower end section of the head pipe 2 and a section of the front fork 7.

A notch 48 that generally has a V-shape is formed in the trough shaped continuous surface B positioned to the rear of the edge line a1. The notch 48 has an upper inclined edge B1 that extends diagonally forwards and downwards from the upper edge rear end, and a lower inclined edge B2 that extends diagonally rearward and downward from a lower end of the lower inclined edge B1 and overlaps a lower edge section of the tank rail 3. As a result of the notch 48, an outer side wall of the tank rail 3 is exposed.

A front section inner surface of the front cover 40 is formed with a vertical rib 40g that extends linearly in the upward-downward direction and a horizontal rib 40h that protrudes forward from a center section of the vertical rib 40g.

The radiator cap 30e is positioned such that a section thereof overlaps with a rear side of the vertical rib 40g of the right front cover 40 (refer to FIG. 4). As a result, if someone inserts his/her hand from the outside and turns the radiator cap 30e, the cap 30e interferes with the vertical rib 40g. Accordingly, it is possible to inhibit people meddling with the radiator cap 30e.

An attachment rib 40i that protrudes to the rear is formed in a lower end section of the vertical rib 40g of the lower half section 40b. Attachment rib 40i is fixed to a bottom wall of the tank 30c of the radiator 30 by a positioning pin 41 including an elastic bush.

An attachment seat 40j is formed to inwardly recess in a rear end section of the lower half section 40b. Attachment seat 40j is fixed to a cover bracket 42 fixed to the lower surface of the tank rail 3 by a bolt (not shown) that is screwed in from the outer side.

A bolt hole 40k is formed in the front side neighboring section C1 of the upper half section 40a. The front side neighboring section C1 is fixed to a cover bracket 45 fixed to the outer side wall of the tank rail 3 by a bolt 44 that is screwed in diagonally upwards (see FIG. 6).

A positioning rib 40n that has a cut out hole 40m that opens to the inside is formed in the rear side neighboring section E1 of the upper half section 40b. The cut out hole 40m of the positioning rib 40n is fitted via an elastic bush 47 to a positioning pin 46 fixed to the outer side wall of the tank rail 3 (see FIG. 7), thereby regulating the movement of the front cover 40 in the upward-downward direction, the front-back direction, and the inward vehicle width direction. As a result of this structure, the front cover 40 is attached to the tank rail 3 and the radiator 30 with a large degree of space being left with respect to the tank rail 3 in both the up-down direction and the forward-backward direction.

According to the present embodiment, the front cover 40 adopts a structure including: the front side neighboring section C1 that is adjacent to the front side outer side sections 3b of the left and the right tank rails 3, 3; the rear side neighboring section E1 that is adjacent to the rear side outer side section 3c; and the overhanging surface A1 that protrudes outwards in the vehicle width direction with respect to the front side outer side sections 3b of the tank rails 3. Accordingly, while providing a frame shape in which the head pipe neighboring section of the tank rails 3 becomes narrower, the body cover 40 also has a shape that is solid and 3-dimensional. The head pipe neighboring section of the tank rails 3 conveys a greater impression of being large, and thereby has a robust and strong external appearance.

The overhanging surface A1 forms the front-rear direction continuous surface that extends forward continuously from the front side neighboring section E1. As a result, the continuous surface relatively overhangs to the outside in the vehicle width direction as compared to the front side outer side sections 3b of the tank rails 3, thereby providing the front cover 40 with a shape that has an external appearance that is solid and 3-dimensional without being complicated.

In the present embodiment, the vehicle width direction continuous surface C extends continuously in a curved shape toward the inside from the upper edge of the overhanging surface A1. As a result, the continuous surface C fills the space between the overhanging surfaces A1 and the tank rails 3, thereby further enhancing the impression of solidness created by the front cover 40.

The front side neighboring section C1 formed in the vehicle width direction continuous surface C is fixed to the cover bracket 45 of the tank rails 3 by the bolt 44 screwed in from above. Accordingly, the attachment operation of the front cover 40 is simple, and the bolt 44 is positioned such that it is not conspicuous when the vehicle is viewed from the side.

In the present embodiment, the vehicle width direction continuous surface C positioned at the upper front side edge of the front cover 40 is positioned to the rear and downward from the headlight 15. As a result, the headlight 15 is exposed to the outer side, and the area around the headlight 15 has an external appearance that is clean and uncluttered.

Further, the front end section G of the front cover extends to the position at which it overlaps with the section of the front fork 7, including the lower end section of the head pipe 2. Accordingly, the amount of traveling wind introduced to the radiator 30 is increased and cooling efficiency is improved.

In the present embodiment, the front cover 40 has a structure including the plurality of continuous surfaces A-F that have boundaries formed by the edge lines a1-a5 and that have different angles with respect thereto. Accordingly, front cover 40 has increased rigidity and an impressive and solid external appearance.

In the present embodiment, the notch 48 that generally has a V-shape is formed in the trough shaped continuous surface B positioned to the rear of the edge line a1, and the outer side wall of the tank rails 3 is exposed by the notch 48. Accordingly, the external appearance of the area around the front cover 40 is further enhanced.

In addition, the upper inclined edge B2 of the trough shaped continuous surface B overlaps with the lower edge section of the tank rails 3. Accordingly, there is no gap between the tank rail 3 and the front cover 40, further enhancing the external appearance.

In the present embodiment, the front covers 40 introduce traveling wind to the radiator 30. However, the front cover of the invention may of course be applied to a structure in which traveling wind is introduced to an air-cooled engine.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
    a head pipe;
    left and right tank rails extending in a vehicle rear direction from the head pipe; and
    body covers disposed to outer sides of the tank rails in a vehicle width direction, wherein:
    a vehicle width direction space between outer side sections of the tank rails becomes narrower as the outer side sections extend toward the head pipe, and
    each body cover comprises:
    a front side neighboring section adjacent to a front side outer side section of each tank rail that is close to the head pipe;
    a rear side neighboring section further to a rear in a vehicle front-rear direction and further to an outer side in the vehicle width direction than the front side neighboring section such that the rear side neighboring section is adjacent to a rear side outer side section of each tank rail that is farther from the head pipe than the front side outer side section;
    an overhanging surface that, in a plan view, is continuous with the front side neighboring section, and is disposed to the side of the front side outer side section such that the overhanging surface protrudes outwards in the vehicle width direction from the front side outer side section of the tank rails; and
    a vehicle width direction continuous surface that continues from an upper edge of the overhanging surface and extends towards the front side outer side section of the tank rails in a curved shape with a predetermined angle toward the inside in the vehicle width direction.

2. The motorcycle according to claim 1, wherein the overhanging surface forms a front-rear direction continuous surface that extends from a neighboring section of the rear side neighboring section in the vehicle front-rear direction.

3. The motorcycle according to claim 1, wherein a bolt hole for attaching the body covers to the tank rails is formed in the vehicle width direction continuous surface.

4. The motorcycle according to claim 1, wherein an upper edge section of each body cover is disposed, in a side view, to the rear in the vehicle front-rear direction or beneath a headlight disposed to the front side of the head pipe such that the headlight is exposed to the side.

5. The motorcycle according to claim 1, wherein an outer side surface of each body cover has a plurality of continuous surfaces that have boundaries formed by edge lines and that have different angles with respect to the edge lines.

6. The motorcycle according to claim 1, wherein an engine is mounted beneath the tank rails, and in a side view the body covers cover a space between a cylinder head cover of the engine and the tank rails.

7. The motorcycle according to claim 1, wherein the tank rails have an outer side section that spreads out in an upward-downward direction.

8. The motorcycle according to claim 7, wherein the upward-downward direction dimension of a front end section of the tank rails is the same as the axial direction dimension of the head pipe.

9. The motorcycle according to claim 8, wherein respective upper edge sections of the body covers are disposed to the rear in the vehicle front-rear direction or beneath a headlight such that the headlight is exposed to the side.

10. The motorcycle according to claim 7, wherein the front side neighboring section and the rear side neighboring section of the body covers are adjacent to an upper edge of the tank rails.

11. A motorcycle comprising:
    a head pipe;
    left and right tank rails extending in a vehicle rear direction from the head pipe; and
    body covers disposed to outer sides of the tank rails in a vehicle width direction, wherein:
    a vehicle width direction space between outer side sections of the tank rails becomes narrower as the outer side sections extend toward the head pipe, and
    each body cover comprises:
    a front side neighboring section adjacent to a front side outer side section of each tank rail that is close to the head pipe;
    a rear side neighboring section further to a rear in a vehicle front-rear direction and further to an outer side in the vehicle width direction than the front side neighboring section such that the rear side neighboring section is adjacent to a rear side outer side section of each tank rail that is farther from the head pipe than the front side outer side section; and
    an overhanging surface that, in a plan view, is continuous with the front side neighboring section, and is disposed to the side of the front side outer side section such that the overhanging surface protrudes outwards in the vehicle width direction from the front side outer side section of the tank rails, wherein
    an upper edge section of each body cover is disposed, in a side view, to the rear in the vehicle front-rear direction or beneath a headlight disposed to the front side of the head pipe such that the headlight is exposed to the side, and
    a front edge section of each body cover extends to a position that overlaps with at least a section of the head pipe, in a side view.

12. A motorcycle comprising:
    a head pipe;
    left and right tank rails extending in a vehicle rear direction from the head pipe; and
    body covers disposed to outer sides of the tank rails in a vehicle width direction, wherein:
    a vehicle width direction space between outer side sections of the tank rails becomes narrower as the outer side sections extend toward the head pipe, and
    each body cover comprises:
    a front side neighboring section adjacent to a front side outer side section of each tank rail that is close to the head pipe;
    a rear side neighboring section further to a rear in a vehicle front-rear direction and further to an outer side in the vehicle width direction than the front side neighboring section such that the rear side neighboring section is adjacent to a rear side outer side section of each tank rail that is farther from the head pipe than the front side outer side section; and
    an overhanging surface that, in a plan view, is continuous with the front side neighboring section, and is disposed to the side of the front side outer side section such that the overhanging surface protrudes outwards in the vehicle width direction from the front side outer side section of the tank rails, wherein an upper edge section of each body cover is disposed, in a side view, to the rear in the vehicle front-rear direction or beneath a headlight disposed to the front side of the head pipe such that the headlight is exposed to the side, and a front edge section of each body cover extends to a position that overlaps with at least a section of a front fork that is supported by the head pipe, in a side view.

13. A motorcycle comprising:

a head pipe;

left and right tank rails extending in a vehicle rear direction from the head pipe; and body covers disposed to outer sides of the tank rails in a vehicle width direction, wherein:

a vehicle width direction space between outer side sections of the tank rails becomes narrower as the outer side sections extend toward the head pipe, and each body cover comprises:

a front side neighboring section adjacent to a front side outer side section of each tank rail that is close to the head pipe;

a rear side neighboring section further to a rear in a vehicle front-rear direction and further to an outer side in the vehicle width direction than the front side neighboring section such that the rear side neighboring section is adjacent to a rear side outer side section of each tank rail that is farther from the head pipe than the front side outer side section; and an overhanging surface that, in a plan view, is continuous with the front side neighboring section, and is disposed to the side of the front side outer side section such that the overhanging surface protrudes outwards in the vehicle width direction from the front side outer side section of the tank rails, wherein the tank rails have an outer side section that spreads out in an upward-downward direction the front side neighboring section and the rear side neighboring section of the body covers are adjacent to an upper edge of the tank rails, and the body covers have a lower inclined edge that extends diagonally forwards and downwards from an upper edge rear end of the rear side neighboring section, and an upper inclined edge that extends diagonally rearward and downward from a front end of the lower inclined edge, and outer side surfaces of the tank rails are exposed to the side between the upper inclined surface and the lower inclined surface.

14. The motorcycle according to claim 13, wherein the upper inclined edge overlaps with the tank rails in a side view.

* * * * *